United States Patent
Liao et al.

(10) Patent No.: US 10,552,371 B1
(45) Date of Patent: Feb. 4, 2020

(54) DATA STORAGE SYSTEM WITH TRANSPARENT PRESENTATION OF FILE ATTRIBUTES DURING FILE SYSTEM MIGRATION

(71) Applicant: EMC IP Holding Company LLC, Hopkinton, MA (US)

(72) Inventors: Zexian Liao, Shanghai (CN); Yuan Luo, Shanghai (CN); John Bankier, Bearsden (GB); Fei Long, Shanghai (CN); Xianfeng Wang, Shanghai (CN); Ronald Brown, Dunfermline (GB)

(73) Assignee: EMC IP Holding Company LLC, Hopkinton, MA (US)

(*) Notice: Subject to any disclaimer, the term of this patent is extended or adjusted under 35 U.S.C. 154(b) by 313 days.

(21) Appl. No.: 15/582,712

(22) Filed: Apr. 30, 2017

(51) Int. Cl.
| | |
|---|---|
| G06F 7/00 | (2006.01) |
| G06F 16/11 | (2019.01) |
| G06F 16/13 | (2019.01) |
| G06F 16/172 | (2019.01) |

(52) U.S. Cl.
CPC ............ *G06F 16/119* (2019.01); *G06F 16/13* (2019.01); *G06F 16/172* (2019.01)

(58) Field of Classification Search
None
See application file for complete search history.

(56) References Cited

U.S. PATENT DOCUMENTS

| | | | |
|---|---|---|---|
| 6,205,475 B1* | 3/2001 | Pitts | G06F 12/0813 709/203 |
| 7,743,111 B2 | 6/2010 | Soltis | |
| 7,882,065 B2 | 2/2011 | Stakutis et al. | |
| 8,667,034 B1 | 3/2014 | Simon et al. | |
| 9,898,371 B2* | 2/2018 | Kumarasamy | G06F 9/45558 |
| 2003/0182525 A1 | 9/2003 | O'Connell et al. | |
| 2009/0089344 A1 | 4/2009 | Brown et al. | |
| 2013/0109904 A1* | 5/2013 | Siljamaki | A61N 5/1045 600/1 |
| 2013/0238562 A1* | 9/2013 | Kumarasamy | G06F 9/45558 707/649 |
| 2013/0339390 A1* | 12/2013 | Muller | G06F 11/1464 707/782 |
| 2014/0025796 A1* | 1/2014 | Vibhor | H04L 67/1097 709/222 |
| 2015/0066847 A1* | 3/2015 | Beard | G06F 16/119 707/613 |

(Continued)

*Primary Examiner* — Daniel A Kuddus
(74) *Attorney, Agent, or Firm* — BainwoodHuang

(57) ABSTRACT

A target data storage system performing a migration operation also responds to client requests by creating and maintaining a metadata cache for caching attributes of a user file as obtained from a source data storage system. A read-type client request is processed by (1) determining whether the metadata cache stores current attribute values, (2) if so, then satisfying the client request using the current values in the metadata cache, and (3) otherwise obtaining current attribute values from the source data storage system and satisfying the client request using the obtained current attribute values, and storing the current values in the metadata cache to be available for use in processing subsequent read-type client requests. A write-type client request is processed forwarding modified attribute values from the client request to the source data storage system for storage therein.

18 Claims, 4 Drawing Sheets

(56) References Cited

U.S. PATENT DOCUMENTS

| | | | |
|---|---|---|---|
| 2015/0066852 A1* | 3/2015 | Beard | G06F 16/178 |
| | | | 707/625 |
| 2015/0067759 A1* | 3/2015 | Beard | H04L 63/20 |
| | | | 726/1 |
| 2016/0078245 A1* | 3/2016 | Amarendran | G06F 16/164 |
| | | | 713/193 |
| 2016/0092119 A1 | 3/2016 | Butterworth et al. | |
| 2016/0142485 A1* | 5/2016 | Mitkar | G06F 16/128 |
| | | | 707/681 |
| 2016/0182570 A1* | 6/2016 | Beard | H04L 63/20 |
| | | | 726/1 |
| 2016/0210306 A1* | 7/2016 | Kumarasamy | G06F 16/178 |
| 2016/0306984 A1* | 10/2016 | Amarendran | G06F 16/164 |
| 2016/0342661 A1* | 11/2016 | Kumarasamy | G06F 16/2264 |
| 2017/0118290 A1* | 4/2017 | Mitkar | G06F 16/128 |
| 2018/0181598 A1* | 6/2018 | Pawar | G06F 16/21 |

\* cited by examiner

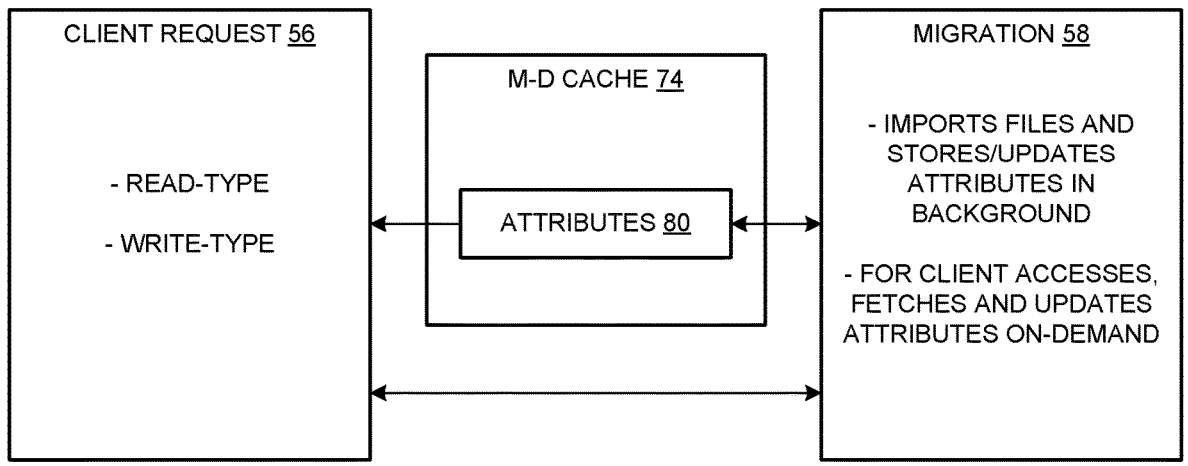
Fig. 5
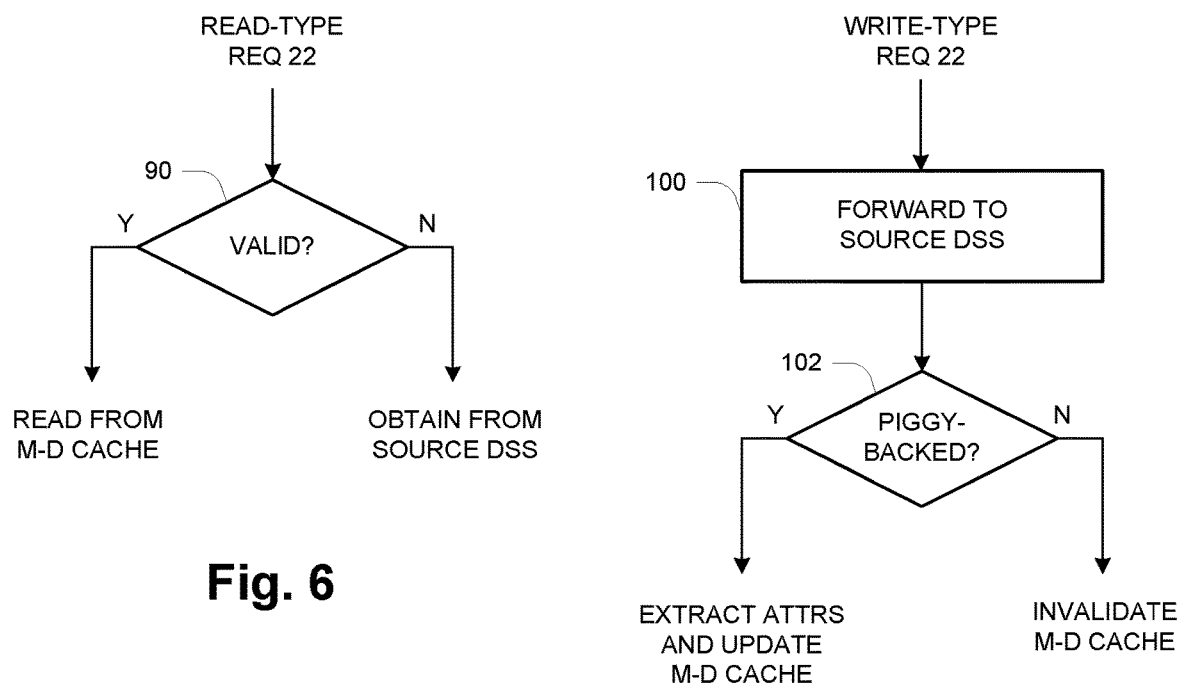
Fig. 6
Fig. 7

DATA STORAGE SYSTEM WITH TRANSPARENT PRESENTATION OF FILE ATTRIBUTES DURING FILE SYSTEM MIGRATION

BACKGROUND

The present invention is related to the field of data storage systems, and in particular to data storage systems having file system migration functionality for importing files from other data storage systems.

SUMMARY

During the incremental copy phase of file importing during a migration of a file system, clients are accessing the file system at a destination (or target) data storage system while the files and directories are being migrated. Because the files and directories are being copied, their attributes (e.g. modified time, file size) at the destination side are constantly changing and are different from the attributes at a source side (i.e., source data storage system), so the attributes are not transparently available to clients at the destination side. For transparency of file and directory attributes, the attributes must be fetched from the source side whenever clients request them before the migration of the file or directory has completed. Generally this could mean that a client IO request must wait for an additional period of sending a request for the attributes (e.g., NFS getAttr call or CIFS query file info or path info call) to the source side and waiting for a reply, which would result in slow response to the client IO.

A solution is disclosed based on caching the file metadata (attributes) at the destination side. File and directory metadata is kept updated, so that metadata changes resulting from file modification during the importing process are accurately presented to clients. File and directory metadata is cached as early as possible, to limit the use of calls to the source side and use less source connection bandwidth. Also, memory usage is limited.

More particularly, a method is disclosed of operating a data storage system operating as a target data storage system performing a migration operation to migrate a file system from a separate source data storage system. The method is performed during the migration operation when a user file is accessible via the target data storage system but not yet migrated to the target data storage system, and includes:

creating and maintaining a metadata cache for caching attributes of the user file as obtained from the source data storage system;

processing a client request for reading the attributes by (1) first determining whether the metadata cache stores current values for the attributes, (2) if so, then satisfying the client request by using the current values stored in the metadata cache, and (3) otherwise obtaining current values for the attributes from the source data storage system and satisfying the client request by using the current values obtained from the source data storage system, and storing the obtained current values in the metadata cache to be available for use in processing subsequent client requests for reading the attributes; and processing a client request for modifying the attributes by forwarding modified attribute values from the client request to the source data storage system for storage therein.

In particular embodiments, the metadata cache may be attached to in-memory representation of an inode called a "vnode", such as by a pointer. Updated attributes may be piggybacked onto a source-side reply to a write-type request forwarded from the destination side, and the piggybacked attributes can be extracted and used to update the M-D cache.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 5 is a schematic depiction of use of the metadata cache by client request processing and migration processing;
FIG. 6 is a simplified flow diagram of processing of a read-type client request;
FIG. 7 is a simplified flow diagram of processing of a write-type client request.

DETAILED DESCRIPTION

Figure 1:
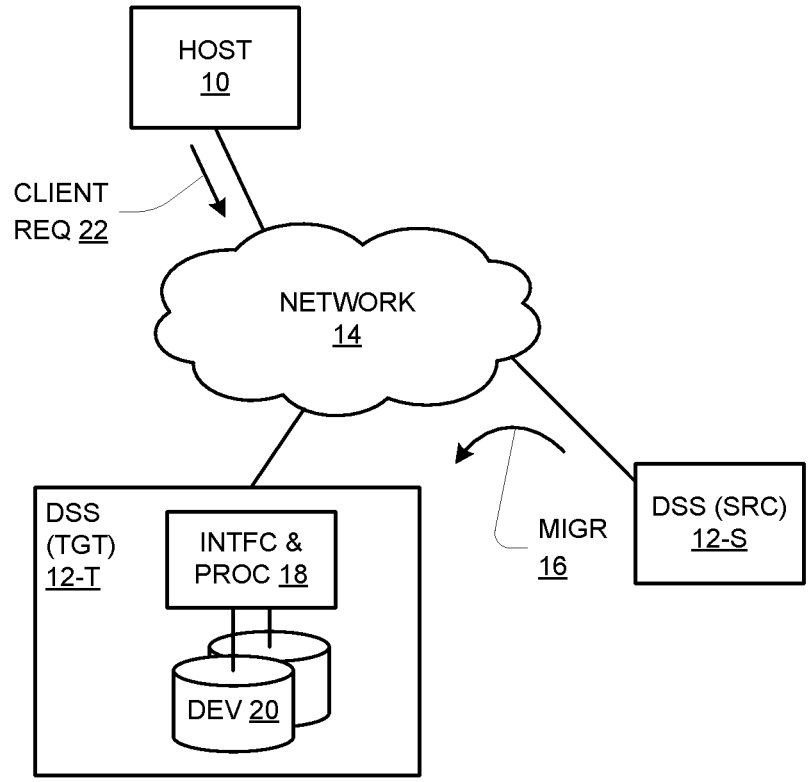
FIG. 1 is a block diagram of a data processing system.

FIG. 1 shows a data processing system including a host computer (HOST) 10 and a pair of data storage systems (DSS) 12 interconnected by a network 14. The data storage systems 12 are shown as a source (SRC) DSS 12-S and a target (TGT) DSS 12-T, referring to their participation in a file system migration (MIGR) operation 16. Each data storage system 12 includes interface and processing circuitry (INTFC & PROC) 18 as well as a set of data storage devices (DEV) 20 such as Flash arrays, magnetic disks, etc.

In operation, the devices 20 provide secondary storage of data used by applications (not shown) executing in the host 10. The applications generate user IO that results in client requests 22 (e.g., reads and writes) to access the data, which are sent to the target DSS 12-T via the network 14. The target DSS 12-T processes the commands and provides an appropriate response, including (1) for a write command, an indication of write completion, and (2) for a read command, the requested data. As generally known, a data storage system 12 may employ a device cache (not shown) that decouples the immediate processing of read and write commands from the underlying physical storage devices 20, generally speeding up operation. Large extents of data may be transferred from a device 20 to the cache, and subsequent reads are satisfied from the device cache with low latency. Similarly, writes may be satisfied by temporarily storing write data in the device cache with low latency, and later de-staging large extents of data from the device cache to a device 20.

The migration operation 16 involves transferring a host-accessible file system existing at the source DSS 12-S to the target DSS 12-T. Once the migration is complete, the file system is subsequently accessed only at the target DSS 12-T, and is removed from the source DSS 12-S. A file system migration may be performed, for example, as part of upgrading storage hardware in a data center, expanding the storage resources of a data center, etc. Migration logic within the target DSS 12-T is responsible for importing the files of the file system from the source DSS 12-S and making the imported files fully accessible locally, and this is generally done as non-disruptively as possible, i.e., as regular production operation of the target DSS 12-T is ongoing. One feature of the migration technique is that the file system is accessible at the target DSS 12-T during the migration, when not all files have yet been transferred. This creates a need to accurately reflect file metadata (attributes) at the target DSS 12-T for use in handling client requests 22 as described more below.

The client requests 22 are broadly divided into read-type requests and write-type requests, in particular based on their usage of metadata associated with a file or directory. A read-type request 22 may be reading file or directory attributes, and a write-type request 22 may be creating or modifying file or directory attributes. Because directories are typically implemented as system-owned files (in contrast to user files), the term "file" is used in the remaining description as a general reference to either directories or user files of a file system.

Figure 2:
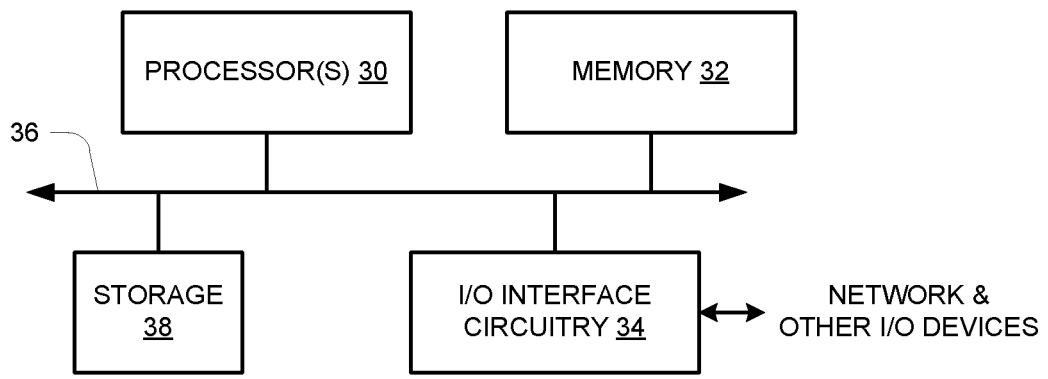
FIG. 2 is a block diagram of computer hardware.

FIG. 2 shows an example configuration of a computer such as a host 10 from a computer hardware perspective. The illustrated arrangement also generally describes the interface and processing circuitry 18 of the data storage system 12. The hardware includes one or more processors 30, memory 32, and interface circuitry 34 interconnected by data interconnections 36 such as one or more high-speed data buses. The interface circuitry 34 provides a hardware connection to the fabric 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
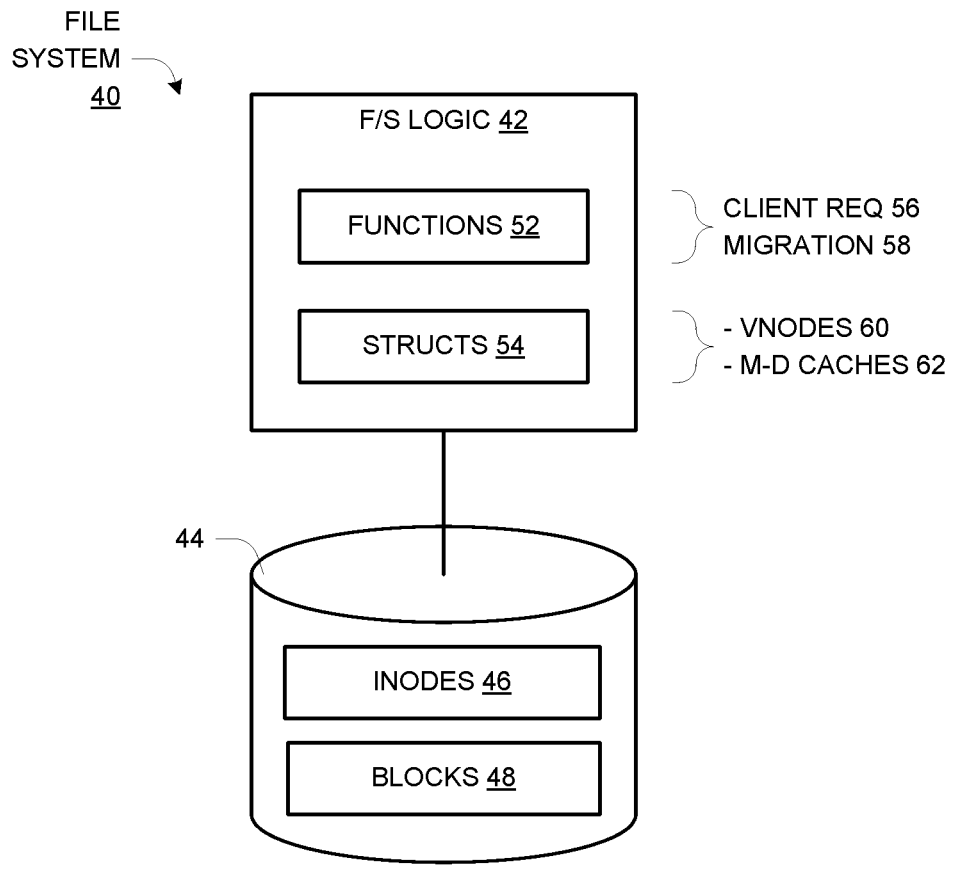
FIG. 3 is a schematic diagram of a file system.

FIG. 3 depicts the file system 40 that is the subject of the migration 16. It is shown as including file system (F/S) logic 42 as well as data persistently stored on an associated volume (VOL) 44. The volume 44 stores the canonical file system data which is a set of inodes 46 and a set of data blocks 48 containing the actual file data, logically organized into files by the inodes 46 as generally known in the art. The file system logic 42 includes functions 52 and data structures (STRUCTS) 54. The functions 52 include a client request function 56 and migration functions 58, as indicated, and the data structures 54 include vnodes 60 and metadata (M-D) caches 62 as also indicated, these being used in connection with processing client requests 22 during migration 16 as described herein.

Figure 4:
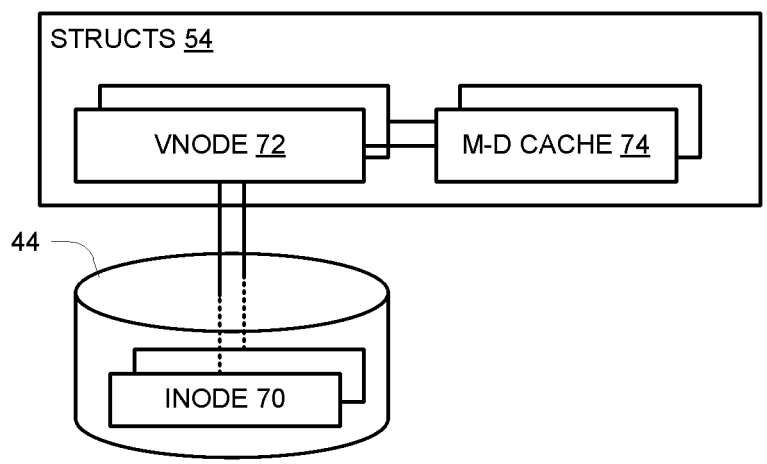
FIG. 4 is a schematic depiction of a relationship between file system inodes and a metadata cache.

FIG. 4 shows a relationship between an individual inode 70 (of inodes 46), a vnode 72 (of vnodes 60) and a metadata (M-D) cache 74 (of M-D caches 62). A vnode 72 is an in-memory copy of an inode 70, also including a pointer to a corresponding M-D cache 74. Thus in the illustrated embodiment a M-D cache 74 can be viewed as an extension of an inode. In alternative embodiments as described below, file metadata may be cached in other ways. One benefit of the illustrated arrangement is the ease with which a M-D cache 74 is accessed in the context of processing a client request 22. Because the request 22 identifies a file and thus an inode, the corresponding vnode is readily identified based on the inode ID, and the M-D cache 74 is found directly by the pointer in the vnode 72.

FIG. 5 is a high-level view of use and management of the M-D cache 74 which contains the attributes 80 (e.g., file size etc. as mentioned above) for a given file. For a read-type request 22, the client request processing 56 accesses the M-D cache 74 to read the attributes 80 when they are present and valid. For a write-type request 22, the client request processing 56 interacts with the migration processing 58 to modify the attributes at the source side, as described more below. The migration processing 58 interacts with the M-D cache 74 in two ways. One is in connection with file importing during the migration process, typically done in a background fashion. The migration processing 58 imports files from the source DSS 12-S and stores/updates the attributes 80 in the M-D cache 74. This operation includes creating the M-D cache 74 when commencing the import of the file, and eventually removing the M-D cache 74 when the file import is complete. The second interaction with the M-D cache 74 is in connection with processing a client request 22, both fetching and updating the attributes 80 as necessary, as explained in more detail below.

FIG. 6 shows processing for a read-type request 22, which is performed by the client request processing 56 and aided by the migration processing 58 as needed. In particular, at 90 it is determined whether the metadata cache 74 exists and has valid contents, i.e., current values of the attributes 80 of the subject file. If so, then the read-type request 22 is satisfied by reading the attribute values from the M-D cache 74. Otherwise, the current attribute values are obtained from the source DSS 12-S and used to satisfy the client request 22, as well as being stored in the M-D cache 74 to be available for use for a subsequent request. This fetching of the attributes from the source DSS 12-S is handled by the migration processing 58, essentially becoming an initiator forwarding the client request 22 to the source DSS 12-S and receiving and processing the response.

FIG. 7 shows processing for a write-type request 22, which is performed by the migration processing 58. At 100, the client request 22 with modified attributes is forwarded to the source DSS 12-S, which performs the update on the authoritative local structure (e.g., inode). Generally the source DSS 12-S returns a completion response, which preferably includes the attributes as just updated. This inclusion of the updated attributes in a response is referred to as "piggybacking". At 102, it is determined whether updated attributes are piggybacked on the response. If so, the updated attributes are extracted from the response and used to update the M-D cache 74 (i.e., stored as the stored attributes 80), where they are available for satisfying future read-type requests 22. Otherwise, the M-D cache 74 is invalidated, because the currently stored attributes 80 have become outdated or "stale" and thus should not be used.

Figure 8:
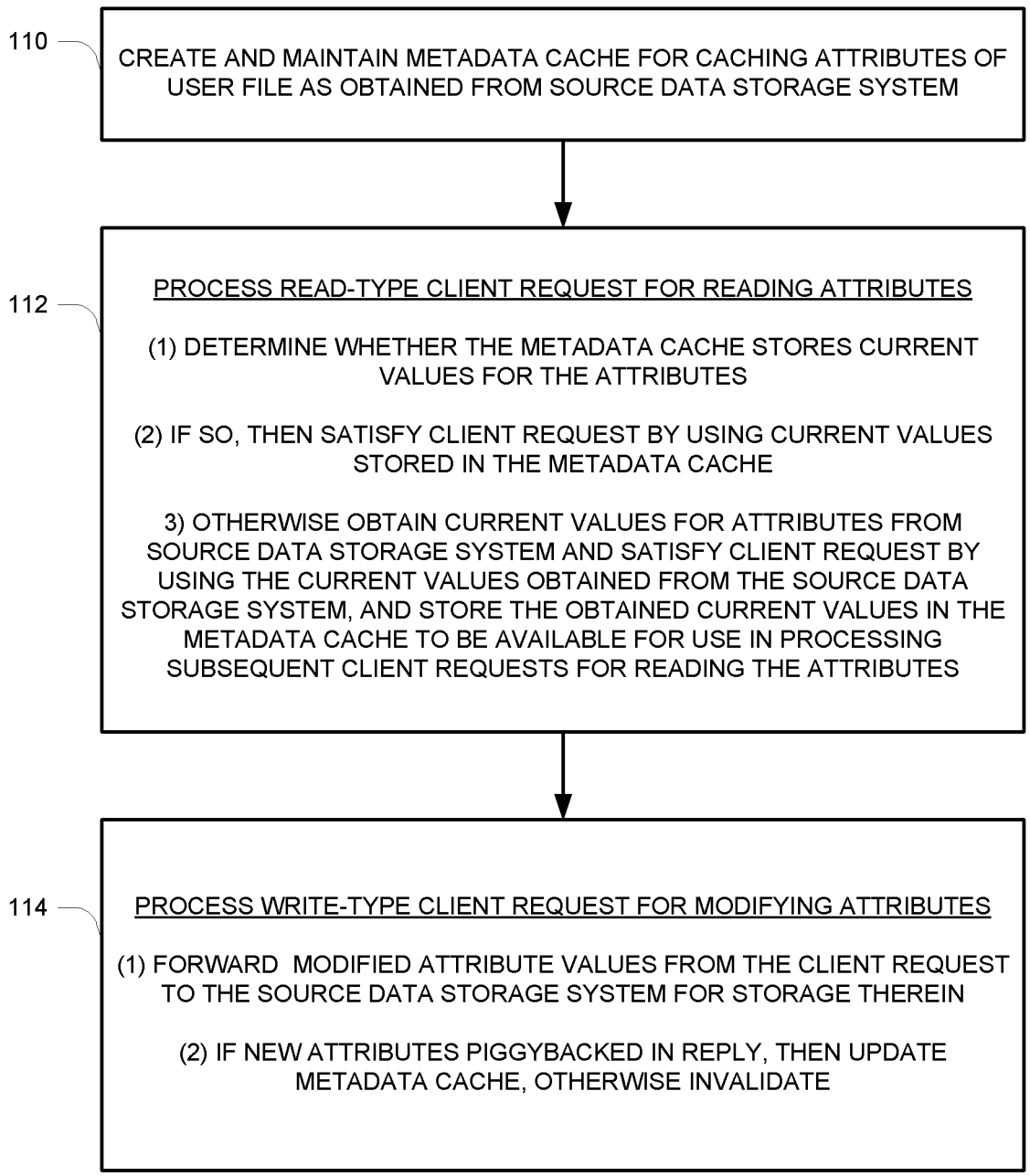
FIG. 8 is a flow diagram for overall processing.

FIG. 8 is a flow chart describing the above processing as performed at a data storage system functioning as a target DSS in a migration.

At 110, the target DSS (e.g., 12-T) creates and maintains a metadata cache (e.g., 74) for caching attributes (e.g., 80) of the user file as obtained from the source data storage system (e.g., 12-S).

At 112, a read-type client request is processed for reading the attributes. First it is determined whether the metadata cache stores current values for the attributes, and if so, then the client request is satisfied by using the current values stored in the metadata cache. Otherwise the current values for the attributes are obtained from the source data storage system and the client request is satisfied by using the current values obtained from the source data storage system, and the current values in the metadata cache to be available for use in processing subsequent client requests for reading the attributes.

At 114, a write-type client request is processed for modifying the attributes by, minimally, forwarding modified attribute values from the client request to the source data storage system for storage therein. As described above with reference to FIG. 7, this processing may also include logic for handling piggybacked updated attributes.

Particular Details of Use of File Import Metadata Cache in Some Embodiments:

1. The metadata cache 74 includes attributes 80 such as the following: file size, used disk space, file access mode, number of hard links, access time, modify time, CIFS creation time. These are selected because they might impact attribute transparency.

2. The metadata cache 74 for a file or directory is created at destination side (DSS 12-T) when the file or directory is first created by the file import process. It is then attached to the vnode 72 and filled with the initial attributes from the source DSS 12-S. Attaching the metadata cache 74 to the vnode 72 has two benefits:
   a. Locating the metadata cache 74 is efficient, because the file system has already located the vnode 72 so following the metadata cache attachment pointer locates the metadata cache 74.
   b. The memory usage of the metadata cache is then controlled by vnode memory management. When vnode memory usage exceeds a threshold, the vnode is recycled and the associated metadata cache is released.

3. When client IO needs to read attributes, it first checks if the metadata cache 74 contains valid data. If so, the attributes are read from metadata cache 74, and otherwise they are fetched from the source side (DSS 12-S), e.g., using NFS getAttr call or CIFS query file info or path info call. When the attributes are returned they are used to update the metadata cache 74 and complete the client IO.

4. When client IO might modify the attributes, the new attributes generated at the source side can be piggybacked in an NFS reply (e.g. postOpAttr), then they are extracted from the reply and updated into the metadata cache. If CIFS IO is being used to communicate with the source file system, metadata attributes may not be returned in the reply, unless it is a reply to an explicit metadata query request. If there is no piggybacked attribute (e.g. NFS attribute_follows=0 or a CIFS request was used), the metadata cache is marked as invalid and the attributes will later be on-demand fetched as described in point 3 above. Using piggybacked attributes saves the need to send a separate call (e.g., getAttr call) to the source side, and updates the cache at the earliest point after modification occurs.

The following table shows various client IO requests 22, both read-type (R) and write-type (W).

| Operation (type: R/W) | Returned attribute |
|---|---|
| write (W) | Obj.Wcc.After.PostOpAttr |
| create (W) | Dir.Wcc.After.PostOpAttr |
| mknod (W) | Dir.Wcc.After.PostOpAttr |
| mkdir (W) | Dir.Wcc.After.PostOpAttr |

-continued

| Operation (type: R/W) | Returned attribute |
|---|---|
| symlink (W) | Dir.Wcc.After.PostOpAttr |
| remove (W) | Dir.Wcc.After.PostOpAttr |
| rmdir (W) | Dir.Wcc.After.PostOpAttr |
| settAttr (W) | Obj.Wcc.After.PostOpAttr |
| readdir (R) | Dir.Attr.PostOpAttr |
| read (R) | Obj.Attr.PostOpAttr |
| lookup (R) | Dir.Attr.PostOpAttr |
| readLink (R) | Obj.Attr.PostOpAttr |

When the migration of this file or directory has completed, the metadata is set to the inode at the destination side and removed from the cache. So subsequent client IOs will fetch attributes from destination side and the metadata cache memory is released.

Thus disclosed is a method of operating a data storage system operating as a target data storage system performing a migration operation to migrate a file system to the target data storage system from a separate source data storage system. The method is performed during the migration operation when a user file is accessible via the target data storage system but not yet migrated to the target data storage system, and includes:

creating and maintaining a metadata cache for caching attributes of the user file as obtained from the source data storage system;

processing a client request for reading the attributes by (1) first determining whether the metadata cache stores current values for the attributes, (2) if so, then satisfying the client request by using the current values stored in the metadata cache, and (3) otherwise obtaining current values for the attributes from the source data storage system and satisfying the client request by using the current values obtained from the source data storage system, and storing the obtained current values in the metadata cache to be available for use in processing subsequent client requests for reading the attributes; and processing a client request for modifying the attributes by forwarding modified attribute values from the client request to the source data storage system for storage therein.

Embodiments may include the following:

The metadata cache is attached to in-memory vnode, e.g., by a pointer

Updated attributes may be piggybacked onto a source-side reply to a write-type request forwarded from the destination side, and the piggybacked attributes can be extracted and used to update the M-D cache.

Alternatives

The metadata may be cached in alternative ways. In one alternative, the migration processes 58 may employ a migration data store to store all migration-related metadata during a migration operation, which may be implemented for example as a sparse file indexed by inode number. Such a single data store can be augmented to include file attribute caching as described herein. One disadvantage of this approach is the inherently higher storage overhead—the data store may be large even if the actual file system size is small, and it may be difficult to reclaim storage space as files become fully imported during migration Another option is to use a hidden directory on the destination side (target DSS 12-T) with a single file per migration entity, containing cached attributes for the corresponding entity on the source side. This approach may offer better persistence over the vnode approach described herein: the cached attributes would be maintained in the file even when the corresponding vnode is unloaded from memory. Also, like the vnode approach, the hidden directory approach allows for space to be reclaimed as migration progresses.

While various embodiments of the invention have been particularly shown and described, it will be understood by those skilled in the art that various changes in form and details may be made therein without departing from the scope of the invention as defined by the appended claims.

What is claimed is:

1. A computer-implemented method of operating a data storage system operating as a target data storage system performing a migration operation to migrate a file system to the target data storage system from a separate source data storage system, the method comprising the steps, performed by the target data storage system during the migration operation when a user file is accessible via the target data storage system but not yet migrated to the target data storage system, of:
   creating and maintaining a metadata cache for caching attributes of the user file as obtained from the source data storage system;
   processing a client request for reading the attributes by (1) first determining whether the metadata cache stores current values for the attributes, (2) if so, then satisfying the client request by using the current values stored in the metadata cache, and (3) otherwise obtaining current values for the attributes from the source data storage system and satisfying the client request by using the current values obtained from the source data storage system, and storing the obtained current values in the metadata cache configured to be available in processing subsequent client requests for reading the attributes; and
   processing a client request for modifying the attributes by forwarding modified attribute values from the client request to the source data storage system for storage in the source data storage system,
   wherein processing a client request for modifying the attributes includes:
      receiving a completion response from the source storage system;
      determining whether updated attributes are piggybacked on the completion response; and
      if the updated attributes are piggybacked on the completion response, then extracting the updated attributes from the response and storing them in the metadata cache as stored attributes where they are available for satisfying future client requests for reading the attributes, and otherwise invalidating the metadata cache to reflect that currently stored attributes have become outdated and should not be used.

2. The method of claim 1, wherein the user file is realized by an inode in the target data storage system, and wherein the target data storage system further maintains a vnode being an in-memory copy of the inode and also including a pointer to the metadata cache, the vnode being identifiable based on an inode ID identifying the inode, and wherein processing the client request includes, based on the request identifying a file and the inode, identifying the vnode and then the metadata cache by the pointer in the vnode.

3. The method of claim 1, wherein memory usage of the metadata cache is controlled by vnode memory management.

4. The method of claim 3, wherein, when vnode memory usage exceeds a threshold, the vnode is recycled and the associated metadata cache is released.

5. The method of claim 1, wherein the migration processing includes two interactions with the metadata cache, a first interaction including file importing during the migration and performed in a background fashion, the second interaction being in connection with client request processing, the file importing including importing files from the source storage system and storing or updating file attributes in the metadata cache, the client request processing including the obtaining of the attributes from the source storage system as an initiator forwarding a client request to the source storage system and receiving and processing the response.

6. The method of claim 5, wherein the file importing further includes creating the metadata cache when commencing the importing of the file, and eventually removing the metadata cache when the file importing is complete.

7. The method of claim 1, wherein the metadata cache is realized as a migration data store storing all migration-related metadata during the migration operation.

8. The method of claim 7, wherein the migration data store is realized as a sparse file indexed by inode number and augmented to include file attribute caching.

9. The method of claim 1, wherein the migration data store is realized using a hidden directory on the target storage system with a single file per migration entity containing cached attributes for a corresponding entity on the source storage system, the hidden directory providing for memory space to be reclaimed as the migration operation progresses.

10. A data storage system comprising secondary storage devices and interface and processing circuitry configured and operative to execute computer program instructions to operate the data storage system as a target data storage system performing a migration operation to migrate a file system to the target data storage system from a separate source data storage system, the operation of the target data storage system including the steps, performed during the migration operation when a user file is accessible via the target data storage system but not yet migrated to the target data storage system, of:
   creating and maintaining a metadata cache for caching attributes of the user file as obtained from the source data storage system;
   processing a client request for reading the attributes by (1) first determining whether the metadata cache stores current values for the attributes, (2) if so, then satisfying the client request by using the current values stored in the metadata cache, and (3) otherwise obtaining current values for the attributes from the source data storage system and satisfying the client request by using the current values obtained from the source data storage system, and storing the obtained current values in the metadata cache configured to be available in processing subsequent client requests for reading the attributes; and
   processing a client request for modifying the attributes by forwarding modified attribute values from the client request to the source data storage system for storage therein,
   wherein processing a client request for modifying the attributes includes:
      receiving a completion response from the source storage system;
      determining whether updated attributes are piggybacked on the completion response; and if the updated attributes are piggybacked on the completion response, then extracting the updated attributes from the response and storing them in the metadata cache as stored attributes where they are available for satisfying future client requests for reading the attributes, and otherwise invalidating the metadata cache to reflect that currently stored attributes have become outdated and should not be used.

11. The data storage system of claim 10, wherein the user file is realized by an inode in the target data storage system, and wherein the target data storage system further maintains a vnode being an in-memory copy of the inode and also including a pointer to the metadata cache, the vnode being identifiable based on an mode ID identifying the inode, and wherein processing the client request includes, based on the request identifying a file and the inode, identifying the vnode and then the metadata cache by the pointer in the vnode.

12. The data storage system of claim 10, wherein memory usage of the metadata cache is controlled by vnode memory management.

13. The data storage system of claim 12, wherein, when vnode memory usage exceeds a threshold, the vnode is recycled and the associated metadata cache is released.

14. The data storage system of claim 10, wherein the migration processing includes two interactions with the metadata cache, a first interaction including file importing during the migration and performed in a background fashion, the second interaction being in connection with client request processing, the file importing including importing files from the source storage system and storing or updating file attributes in the metadata cache, the client request processing including the obtaining of the attributes from the source storage system as an initiator forwarding a client request to the source storage system and receiving and processing the response.

15. The data storage system of claim 14, wherein the file importing further includes creating the metadata cache when commencing the importing of the file, and eventually removing the metadata cache when the file importing is complete.

16. The data storage system of claim 10, wherein the metadata cache is realized as a migration data store storing all migration-related metadata during the migration operation.

17. The data storage system of claim 16, wherein the migration data store is realized as a sparse file indexed by Mode number and augmented to include file attribute caching.

18. The data storage system of claim 10, wherein the migration data store is realized using a hidden directory on the target storage system with a single file per migration entity containing cached attributes for a corresponding entity on the source storage system, the hidden directory providing for memory space to be reclaimed as the migration operation progresses.

* * * * *